July 2, 1957 G. PRALL 2,797,572
SAFETY LOCK FOR AUTOMOBILE HUB CAPS
Filed March 1, 1955 2 Sheets-Sheet 1
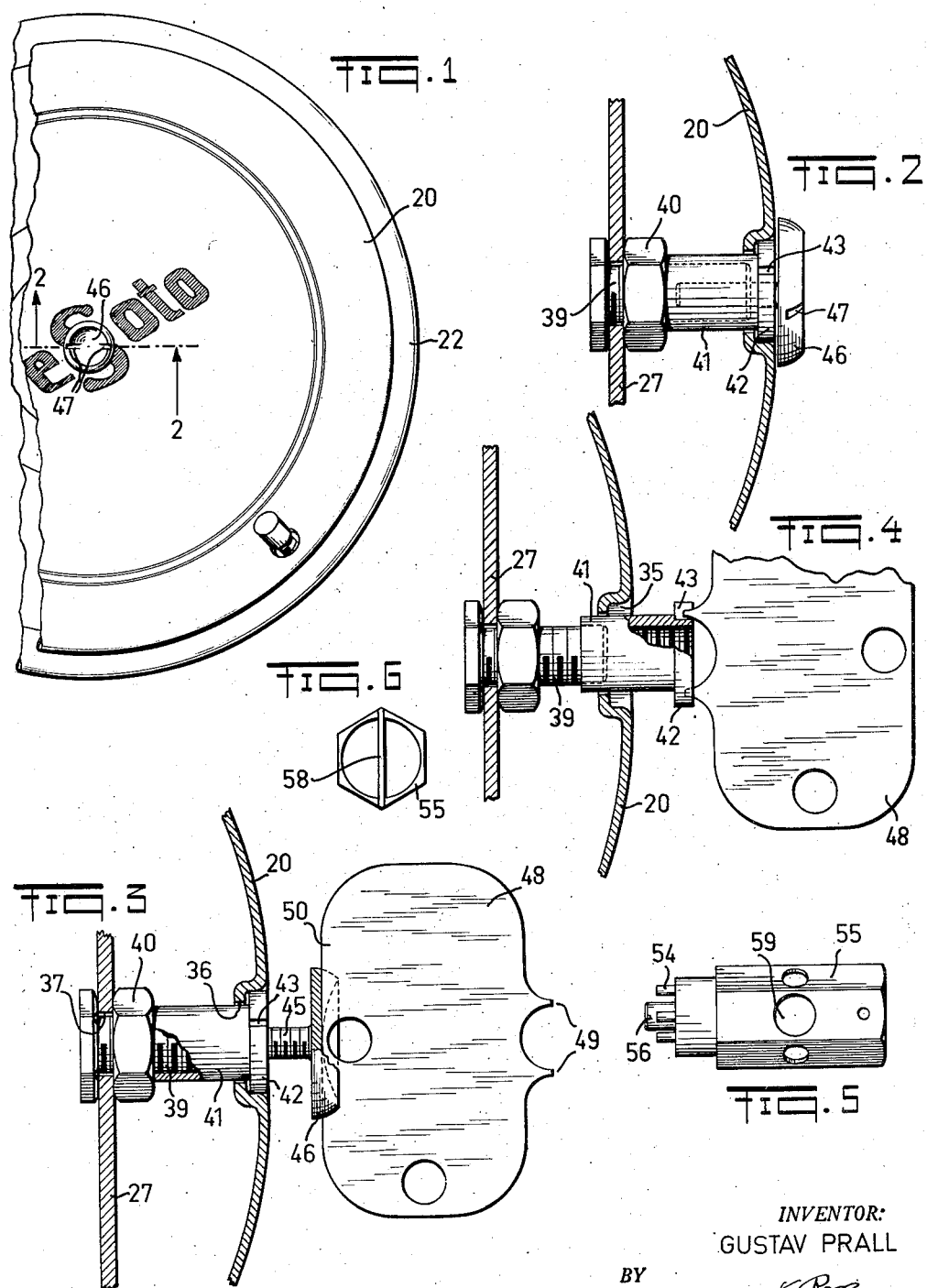
INVENTOR:
GUSTAV PRALL
BY
Karl F. Ross
AGENT

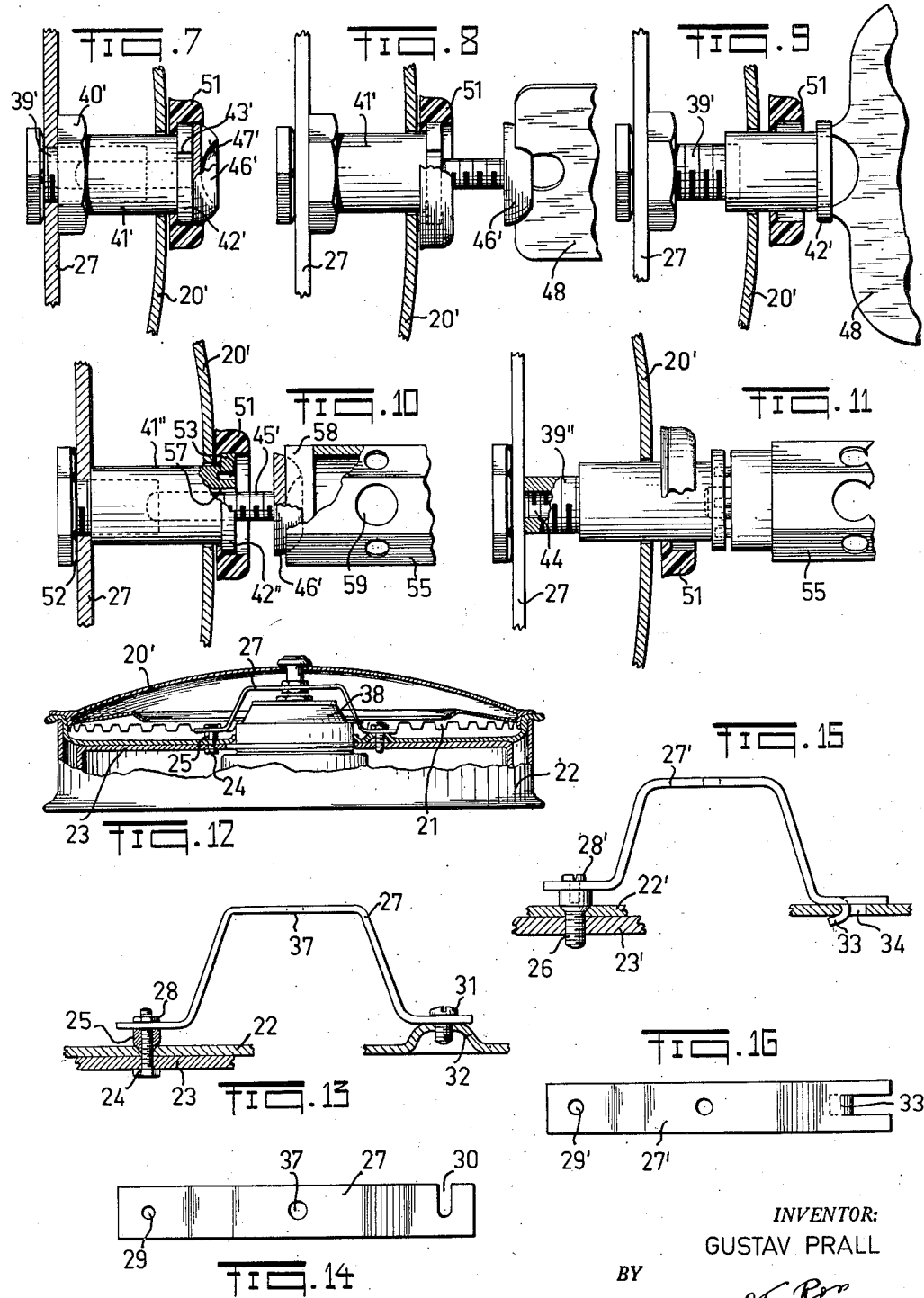

United States Patent Office 2,797,572
Patented July 2, 1957

2,797,572

SAFETY LOCK FOR AUTOMOBILE HUB CAPS

Gustav Prall, New York, N. Y.

Application March 1, 1955, Serial No. 491,404

2 Claims. (Cl. 70—258)

My present invention relates to a safety lock for automobile hub caps, especially (but not exclusively) for hub caps of the large, ornamental type designed to cover substantially the entire face of the tire-carrying wheel.

In my co-pending patent application Serial No. 335,880, filed February 9, 1953, now Patent No. 2,723,585, dated November 15, 1955, I have disclosed a device adapted to be anchored to the wheel adjacent its periphery and to engage the hub cap by means of an enlarged head capable of being detached from its base only with the aid of a special combination of tools. The eccentric positioning of this device necessitates the use of counterbalancing means on the wheel; also, it is not always convenient to mount the device on the wheel flange next to the rim.

An object of my present invention is to provide an improved safety lock for automobile hub caps, incorporating a device similar to the one disclosed in my aforementioned co-pending application in combination with means for mounting same at the center of the wheel.

Another object of my present invention is to provide a safety lock designed to give even greater assurance against its removal by unauthorized persons.

A further object of my present invention is to provide a special tool or key adapted to serve as a means for locking and unlocking my improved safety device to the exclusion of more common utensils such as screwdrivers, pliers and wrenches.

A feature of this invention resides in the provision of a bracket or similar support secured to the center of the wheel underneath the hub cap and having a threaded first member, such as a stud, projecting therefrom, this stud forming part of my improved safety lock which further includes a threaded second member, such as a sleeve, mating with the stud and passing through the center of the hub cap when the latter is in place; an enlarged portion or retaining head of this sleeve serves as the actual lock and is concealed by an overlying masking element or shield secured to one of the two members referred to, preferably to the stud. While the shield may be formed with a simple diametrical slot adapted to receive a blade similar to but advantageously thinner than the edge of a conventional screwdriver, I prefer to provide the concealed face of the head underneath the shield with a distinctive profile of, say, one or more recesses of special configuration engageable only by a tool made to fit the particular lock involved. This tool may be a relatively simple key having one or more projections on one end designed to fit the recessed head and having a blade on the other end adapted to enter the notched or slotted shield.

The above and other objects and features of my invention will become more fully apparent from the following detailed description, reference being had to the accompanying drawing in which:

Fig. 1 is a partial front elevational view of a hub cap engaged by a safety lock according to my invention;

Fig. 2 is a side elevational view of the safety lock of Fig. 1, parts of the hub cap and the wheel being shown in section taken on the line 2—2 of that figure;

Fig. 3 is a view similar to Fig. 2 but illustrating the assembly or disassembly of the safety lock by a special key;

Fig. 4 is a view similar to Fig. 3 but illustrating another step in the assembly or disassembly of the device by means of the key;

Fig. 5 is a side elevational view of a modified key adapted to operate a safety lock according to the invention;

Fig. 6 is an end view of the key of Fig. 5;

Figs. 7, 8 and 9 illustrate three successive steps in the disassembly of a slightly different safety lock, embodying the invention, by the key shown in Figs. 3 and 4;

Figs. 10 and 11 illustrate successive steps in the disassembly of still another somewhat modified safety lock, according to the invention, by the key shown in Figs. 5 and 6;

Fig. 12 is an axial sectional view through a wheel and hub cap assembly, showing the mounting of the bracket forming part of my device;

Figs. 13 and 14 show, in side elevation and in plan view respectively, the bracket of Fig. 12 drawn to a larger scale; and Figs. 15 and 16 are similar to Figs. 13 and 14 respectively, showing a somewhat modified form of bracket.

The hub cap 20, Figs. 1–4, or 20', Figs. 7–12, is provided with conventional means, such as teeth 21, for frictionally engaging the inner periphery of a wheel 22 or 22' as illustrated in Fig. 12. The wheel is secured to the brake drum 23 or 23' in the usual manner, as with the aid of bolts 24 engaged by tapering nuts 25 (Figs. 12, 13) or by means of bolts 26 having tapering heads (Fig. 15).

A bracket 27, Figs. 12–14, is secured to the wheel 22 with the aid of an auxiliary nut 28 on one of the bolts 24 whose normal clamping nut 25 has been somewhat foreshortened to accommodate nut 28; this bolt 24 passes through a hole 29 in one of the legs of bracket 27, the other leg having a slot 30 adapted to be engaged by a screw 31 threaded into a boss 32 of wheel 22. A similar bracket 27', Figs. 15 and 16, is adapted to be used in place of bracket 27 when a wheel 22' is secured to a brake drum 23' by means of bolts 26; bracket 27' is fixed to one of the bolts 26 by a screw 28' passing through hole 29' in one of its legs, the other leg having a hook 33 adapted to engage a slot 34 in wheel 22'. Although either of the brackets 27, 27' can be used with equal facility in the embodiments of my invention to be described in conjunction with Figs. 2–11, for convenience only the bracket 27 will be referred to.

In Figs. 1–4 I have illustrated a hub cap 20 provided with a central recess 35 having a bore 36 coaxial with a hole 37 in bracket 27 which, as seen in Fig. 12, centrally spans the wheel hub 38. A threaded stud 39 passes through hole 37 and is secured to bracket 27 by means of a nut 40; stud 39 extends toward but does not quite traverse the bore 36 of hub cap 20. After this hub cap has been frictionally secured to the wheel 22 with the aid of teeth 21, a threaded sleeve 41 is inserted through the bore 36 and matingly engages the stud 39. The head 42 of sleeve 41 has a pair of diametrically opposite radial notches 43 which, as best seen in Fig. 4, extend inward from its periphery for a short distance only. Stud 39 is further provided with a threaded internal bore 44 (see Fig. 11) adapted matingly to receive the threaded shank 45 of a shield member 46 designed to overlie the head 42 within recess 35. Shield 46 is formed with a dished central portion bisected by a pair of diametrically aligned slots 47.

A flat key is provided on one of its sides with a pair of spaced projections 49 mating with the notches 43 in head 42, whereby the sleeve member 41 may be tightened on stud 39 or withdrawn therefrom as illustrated in Fig. 4. The opposite side of key 48 is formed with a rather thin edge 50 fitting the slots 47 of shield 46 as illustrated in Fig. 3. It will be understood that key 48 can thus be used for first attaching the member 41 to bracket 27 so as to prevent accidental or intentional removal of hub cap 20 from wheel 22, and thereafter for applying the shield 46 to the lock so as to conceal the construction of head 42 with its notches 43. It will also be noted that the countersinking of head 42 in recess 35 frustrates any attempt to loosen the sleeve 41 with the aid of pliers, wrenches or the like.

The hub cap 20' (Figs. 7–9) differs from hub cap 20 by the absence of central recess 35. Here the head 42' of a sleeve member 41', matingly engaging stud 39' which is fastened to bracket 27 by nut 40', is received in a socket 51 which also partly surrounds the shield 46'. Socket 51 is freely rotatable around sleeve 41' and prevents the seizure of head 42' by means of wrenches or pliers. The construction of the device of Figs. 7–9 is otherwise similar to that of the lock shown in Figs. 2–4 and the same key 48 can be used to grip head 42' by means of notches 43' and shield 46' by means of slots 47'.

In Figs. 10 and 11 I have shown an assembly generally similar to that of Figs. 7–9 and comprising a stud 39" projecting from bracket 27, a sleeve member 41" threadedly engaging this stud and having a head 42" received in a socket 51, and a slotted shield member 46' having a shank 45' threaded into bore 44 of stud 39". Nut 40' has been omitted, however, stud 39" having been shown instead to be soldered, at 52, to bracket 27. Also, head 42" lacks the notches 43 or 43' of the preceding embodiments but has, instead, three axially extending bores 53 engageable by corresponding pins 54 (Fig. 5) projecting from one end of an elongated, hexagonally prismatic key 55. Key 55 also has a centering pin 56 between pins 54, insertable into a bore 57 in sleeve member 41", and is provided on its opposite end with a diametrical blade 58 fitting the slots 47' of shield 46'. Apertures 59 in the body of key 55 may be used for attaching it to a key chain (not shown) or to accommodate a rod (likewise not shown) affording greater leverage in the loosening or tightening of the elements of the locking device.

It should be noted that my device does not serve primarily for holding a hub cap 20 or 20' in place under normal circumstances; on the contrary, it will generally be desirable to provide a small clearance between the hub cap and the retaining elements (such as 42, 46, 51) of the locking device, in order to prevent any possible loosening of the device through impacts or vibrations in the operation of the vehicle. This can be readily accomplished by a suitable dimensioning of sleeve member 41, 41' or 41" as illustrated in the drawing, taking into account the presence or absence of a nut 40 or 40'.

My invention is, of course, not limited to the specific embodiments described and illustrated but is capable of various modifications and adaptations without departing from the spirit and scope of the appended claims.

I claim:

1. A locking device for automobile hub caps, comprising a support, fastening means for centrally attaching said support to a wheel of an automobile, a first member axially extending from said support toward the center of an operatively positioned hub cap upon the attachment of said support to said wheel, said hub cap having a central aperture, a second member traversing said aperture and detachably engaging said first member, said second member having a retaining head positioned beyond said hub cap and provided with a profiled face affording leverage for rotation of said second member when engaged by a mating tool, a socket element traversed by said second member and freely rotatable around the latter, said socket element overlying said hub cap and having a central recess, said head being completely received within the recess of said socket element, and a shield element threadedly received within said socket element and provided with a profiled face differing from that of said retaining head, said shield element overlying said head and concealing the profiled face of the latter.

2. A device according to claim 1, wherein said shield member is externally slotted.

References Cited in the file of this patent

UNITED STATES PATENTS

| | | |
|---|---|---|
| 1,459,688 | Parkinson | June 19, 1923 |
| 2,249,568 | Shinliver | July 15, 1941 |
| 2,316,695 | Jaffa | Apr. 13, 1943 |
| 2,344,038 | Griffiths | Mar. 14, 1944 |
| 2,708,844 | Cincel | May 24, 1955 |
| 2,722,822 | Thomas | Nov. 8, 1955 |